(12) United States Patent
Wang et al.

(10) Patent No.: US 9,288,152 B2
(45) Date of Patent: Mar. 15, 2016

(54) PRE-FILL RETRANSMISSION QUEUE

(71) Applicant: Futurewei Technologies, Inc., Plano, TX (US)

(72) Inventors: Ruxiang Wang, San Jose, CA (US); Amir H. Fazlollahi, San Jose, CA (US); Guozhu Long, Fremont, CA (US); Yan Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 215 days.

(21) Appl. No.: 14/022,952

(22) Filed: Sep. 10, 2013

(65) Prior Publication Data

US 2014/0105219 A1 Apr. 17, 2014

Related U.S. Application Data

(60) Provisional application No. 61/714,517, filed on Oct. 16, 2012.

(51) Int. Cl.
*H04L 12/863* (2013.01)
*H04L 12/805* (2013.01)
*H04L 1/18* (2006.01)

(52) U.S. Cl.
CPC ............... *H04L 47/50* (2013.01); *H04L 1/188* (2013.01); *H04L 1/1874* (2013.01); *H04L 47/36* (2013.01)

(58) Field of Classification Search
None
See application file for complete search history.

(56) References Cited

U.S. PATENT DOCUMENTS

| | | | | |
|---|---|---|---|---|
| 5,440,542 | A | * | 8/1995 | Procter et al. ................. 370/335 |
| 2008/0063007 | A1 | | 3/2008 | Christiaens et al. |
| 2009/0089638 | A1 | | 4/2009 | Heise et al. |
| 2010/0177701 | A1 | | 7/2010 | Maheshwari et al. |
| 2010/0185791 | A1 | * | 7/2010 | Pons et al. ...................... 710/30 |
| 2011/0154147 | A1 | | 6/2011 | Wu |
| 2011/0274147 | A1 | * | 11/2011 | Schelstraete .......... H04L 1/1887 375/220 |
| 2011/0276826 | A1 | * | 11/2011 | Schoppmeier ........ H04L 1/1896 714/16 |

(Continued)

FOREIGN PATENT DOCUMENTS

| | | |
|---|---|---|
| CN | 101409610 A | 4/2009 |
| CN | 101667897 A | 3/2010 |

(Continued)

OTHER PUBLICATIONS

"Series G: Transmission Systems and Media, Digital Systems and Networks—Digital sections and digital line system—Access networks: Improved impulse noise protection for DSL transceivers," ITU-T Telecommunication Standardization Sector of ITU, G.988.4, Jun. 2010, 78 pages.

(Continued)

*Primary Examiner* — Ayaz Sheikh
*Assistant Examiner* — Tarell Hampton
(74) *Attorney, Agent, or Firm* — Conley Rose, P.C.; Grant Rodolph; Adam J. Stegge

(57) ABSTRACT

A method of discontinuous transmission data communication in a digital subscriber line (DSL) transceiver unit, the method comprising determining that a number of a plurality of bits available to transmit is enough to fill a data transfer unit (DTU), forming a DTU, by a DTU framer, comprising the plurality of bits, transferring the DTU to a retransmission queue, and determining the DTUs from the retransmission queue to be transmitted over a next time period used for transmitting over the DSL subscriber line by the DSL transceiver unit.

20 Claims, 7 Drawing Sheets

(56) References Cited

U.S. PATENT DOCUMENTS

2012/0324262 A1* 12/2012 Chang ............... H04L 5/0053
713/320
2014/0010270 A1 1/2014 Shi et al.

FOREIGN PATENT DOCUMENTS

| CN | 102282794 A | 12/2011 |
|---|---|---|
| WO | 2010083065 A1 | 7/2010 |
| WO | 2012126411 A2 | 10/2011 |

OTHER PUBLICATIONS

"Series G: Transmission Systems and Media, Digital Systems and Networks—Digital sections and digital line system—Access networks: Very high speed digital subscriber line transceivers 2 (VDSL2)," ITU-T Telecommunication Standardization Sector of ITU, G.993.2, Dec. 2011, 376 pages.

Wang, R., et al., U.S. Appl. No. 14/018,907, filed Sep. 5, 2013, titled "Power Saving Idle Data Transmission Units," 37 pages.

Wang, R., et al., U.S. Appl. No. 13/682,842, filed Nov. 21, 2012, titled "Traffic-Adaptive Repeated Transmission," 53 pages.

"Updated draft text for G.fast—version 3.0," ITU Telecommunication Standardization Sector: Study Group 15, Question 4a/15, Temporary Document 2012-11-4A-R20, Chengdu, China, Nov. 9, 2012, 38 pages.

Foreign Communication From a Counterpart Application, PCT Application No. PCT/CN2013/085281, International Search Report dated Jan. 23, 2014, 6 pages.

Foreign Communication From a Counterpart Application, PCT Application No. PCT/CN2013/085281, Written Opinion dated Jan. 23, 2014, 4 pages.

Foreign Communication From a Counterpart Application, European Application No. 13847356.6, Extended European Search Report dated Sep. 24, 2015, 7 pages.

* cited by examiner

PRE-FILL RETRANSMISSION QUEUE

CROSS-REFERENCE TO RELATED APPLICATIONS

The present application claims the benefit of U.S. Provisional Application No. 61/714,517 filed Oct. 16, 2012 by Ruxiang Wang, et al. and entitled "Pre-fill Retransmission Queue," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern digital subscriber line (DSL) communication systems may provide protection against sources of noise, such as impulse noise, by using, for example, retransmission schemes. In retransmission, data transmitted over a subscriber line may be stored at the transmitting site for some time. In the event the receiving side receives corrupt data, the transmitting side may retransmit the data for an additional time.

Retransmission may be triggered by a retransmission request sent from the receiving side. For example, in conventional frequency division duplex (FDD) based DSL systems, a data transfer unit (DTU) may be created only when it is about to be transmitted and only then it may be stored in a retransmission queue. When no user data is available idle DTUs may be generated, and the DTUs may then be continuously transmitted. In such conventional schemes, there may be no indication of availability of the number of user data DTUs ready to be transmitted. This may cause numerous idle cells to be unnecessarily transmitted and retransmitted. Similar issues may exist in time division duplex (TDD) DSL systems, such as G.fast.

SUMMARY

In one embodiment, the disclosure includes a method of discontinuous transmission data communication in a digital subscriber line (DSL) transceiver unit, the method comprising determining that a number of a plurality of bits available to transmit is enough to fill a data transfer unit (DTU), forming a DTU, by a DTU framer, comprising the plurality of bits, transferring the DTU to a retransmission queue, and determining the DTUs from the retransmission queue to be transmitted over a next time period used for transmitting over the DSL subscriber line by the DSL transceiver unit.

In another embodiment, the disclosure includes a discontinuous transmission data communication DSL transceiver unit comprising a retransmission queue, at least one processor configured to determine that a number of a plurality of bits available to transmit is enough to fill a DTU, a DTU framer coupled to the at least one processor and directly connected to the retransmission queue, wherein the DTU framer is configured to form a DTU comprising the plurality of bits, and transfer the DTU to the retransmission queue, wherein the at least one processor is further configured to determine the DTUs from the retransmission queue to be transmitted over a next time period used for transmitting over the DSL subscriber line by the DSL transceiver unit.

In yet another embodiment, the disclosure includes a method of discontinuous transmission data communication in a DSL transceiver unit, the method comprising (1) accumulating bits until there are a plurality of bits sufficient to fill a DTU, (2) forming a DTU, comprising the plurality of bits, by a DTU framer, (3) storing the DTU in a retransmission queue, wherein the retransmission queue is directly connected to the DTU framer, (4) repeating steps (1) through (3) while there is sufficient space in the retransmission queue, (5) determining the number of DTUs to be transmitted from the queue over the next transmission time opportunity, (6) transmitting the DTUs, and (7) discarding DTUs in the retransmission queue that are acknowledged by the receiver or overstayed in the retransmission queue over a time limit.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In conventional schemes data transfer units (DTUs) may be continuously transmitted without an indication of availability of the number of user data DTUs ready to be transmitted. This may cause numerous idle cells to be unnecessarily transmitted and thereby result in inefficiencies and excessive power consumption. As such, it may be desirable to provide for more efficient retransmission of DTUs.

Disclosed herein are methods, apparatuses, and systems to improve the performance of DSL systems that employ a discontinuous transmission. The term "discontinuous transmission" is used generally herein to refer to a mode of operation where data transmission over time is not continuous and may be disrupted. A Time division duplex (TDD) system by definition always operates in discontinuous transmission because the available communication channel between two modems is divided in time for transmission in each direction. A G.fast system is an example of a TDD system that always operates in discontinuous transmission. A frequency division duplex (FDD) system in comparison divides the communication channel in frequency domain between each direction but transmission in time is continuous. However, for power saving or other purposes, an FDD system may operate in discontinuous transmission. A VDSL2 system is an example of a FDD system that may operate in discontinuous transmission; in this case it operates in discontinuous mode. The term "discontinuous mode" in DSL is used generally to refer to a mode of operation where not all of the available time for data transmission is used.

As will be disclosed such methods, apparatuses, and systems may buffer and/or temporarily store DTUs in a retransmission queue for transmission and, thereby provide the ability to employ various power saving techniques based on user traffic. Such methods, apparatuses, and systems provide for reduced power consumption and reduced bandwidth requirements between various parts of a DSL system.

Figure 1:
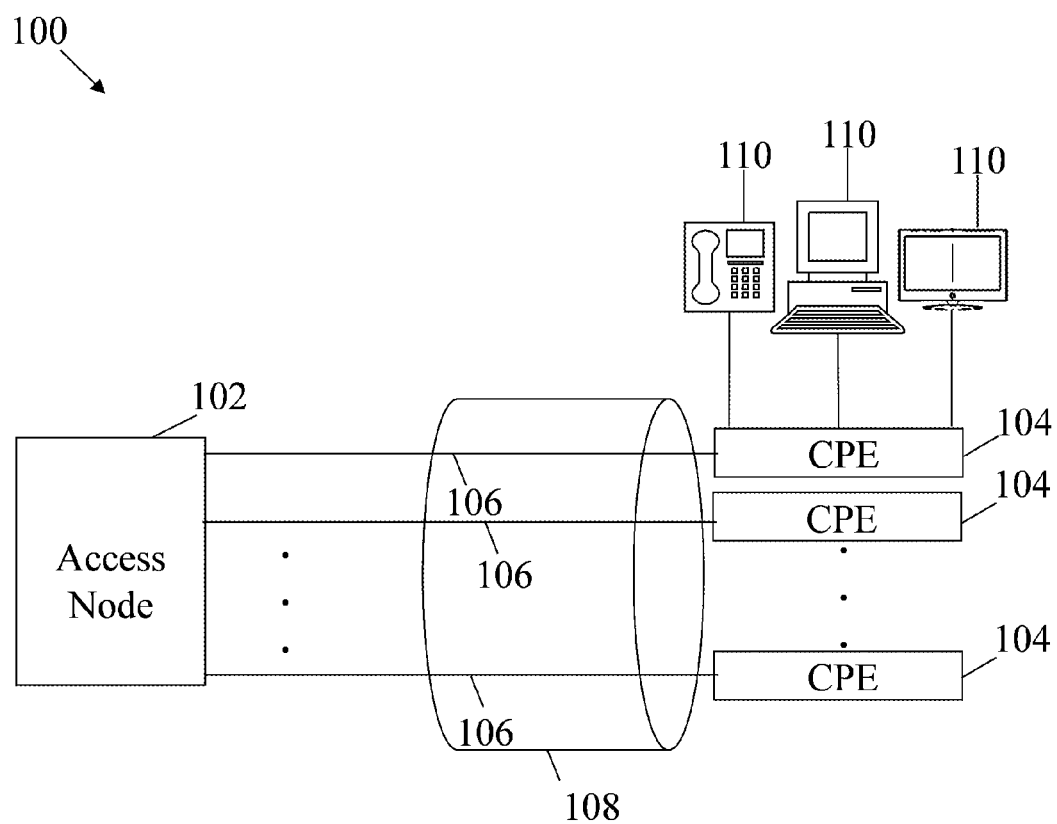
FIG. 1 is a schematic diagram of an embodiment of a digital subscriber line (DSL) network.

FIG. 1 is a schematic diagram of an embodiment of a DSL network 100. The DSL network 100 may be, as examples, an asymmetric digital subscriber line 2 (ADSL2) network, an (ADSL2)+ network, a VDSL2 network, or a G.fast network. In such an embodiment, the DSL network 100 may comprise an access node 102 coupled to one or more customer premises equipment (CPEs) 104 via one or more subscriber lines 106.

The access node 102 may be implemented as an exchange, a DSL access multiplexer (DSLAM), a cabinet, a remote terminal (RT), a distribution point, or any other suitable network device that interacts with the CPEs 104. The access node 102 may be operated by a network service provider. In an embodiment, the access node 102 may comprise a plurality of DSL modems, one for each customer or CPE 104. Such a DSL modem may use a discrete multi-tone (DMT) line code that allocates a plurality of bits for each sub-carrier or tone in each DMT symbol. The DMT may be adjusted to various channel conditions that may occur at each end of a subscriber line. The DSL transceiver in the access node 102 may be configured to transmit data at similar or different rates for each subscriber line 106. The subscriber lines 106 may be any suitable material (e.g., copper) and type (e.g., twisted pair). Additionally, one or more subscriber line 106 may be constrained or bundled, for example, within a binder 108. In an embodiment, each CPE 104 may be located at a customer premise and may be coupled to one or more electronic devices 110. For example, a CPE 104 may be coupled to a telephone, a computer, a television, any other suitable device as would be appreciated by one of ordinary skill in the art upon viewing this disclosure, or combination thereof. The CPE 104 may comprise a router, a switch, and/or a splitter which may couple one or more subscriber lines 106 to the one or more electronic devices 110 (e.g., computer, television, telephone, etc.). Additionally, the CPEs 104 may comprise a DSL transceiver (e.g., a modem, a G.fast transceiver at a remote terminal (FTU-R), etc.) and may be configured to communicate data between the access node 102 and the electronic devices 110, for example, via the subscriber lines 106. For example, the CPEs 104 may be configured to receive and/or process data from the access node 102 and to communicate the received data to the electronic devices 110.

Figure 2:
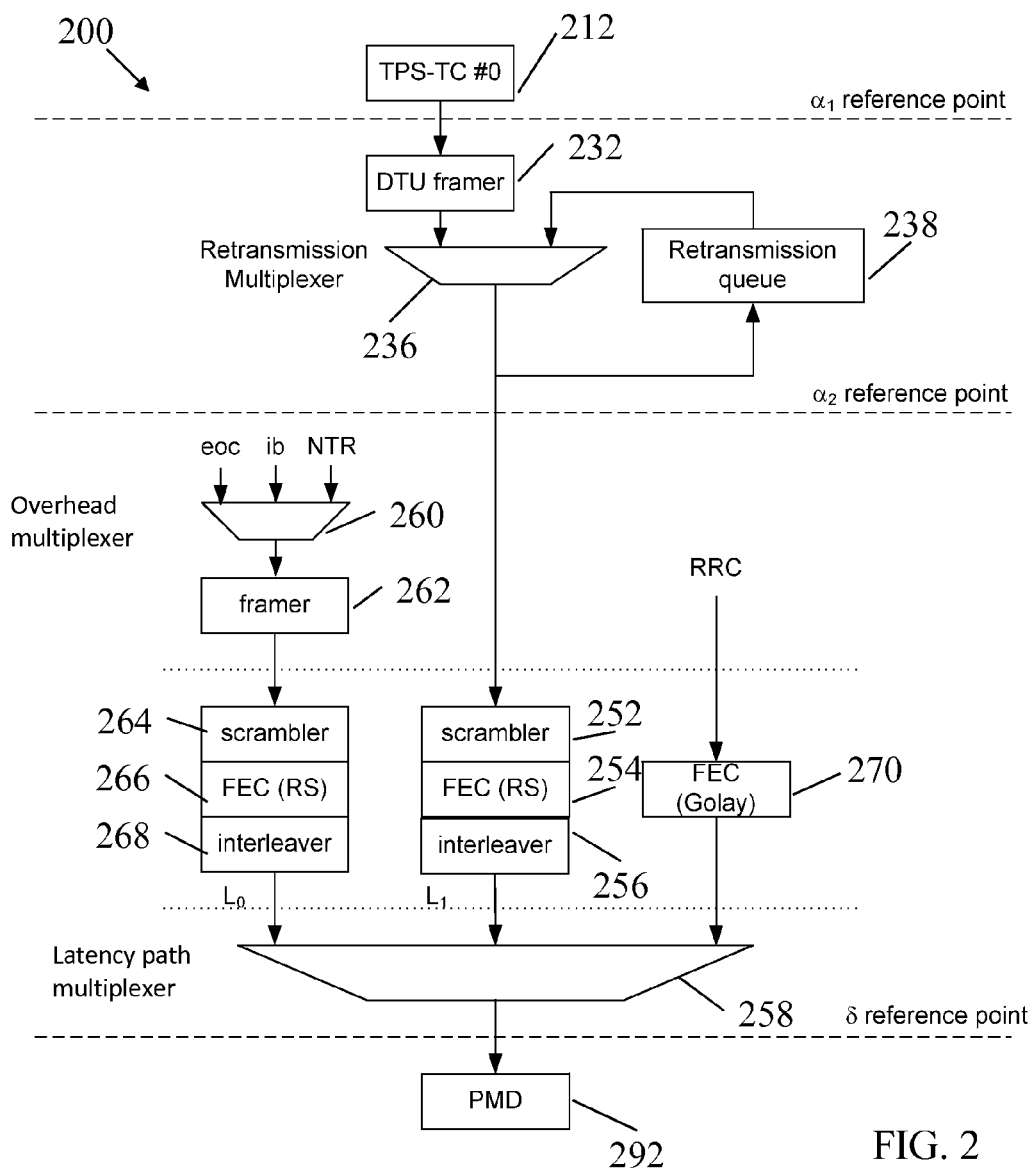
FIG. 2 is a logical view of an embodiment of a conventional DSL modem.

FIG. 2 is a logical view of an embodiment of a conventional DSL modem 200. The DSL modem 200 may be employed in an access node, such as access node 102. The DSL modem 200 may correspond to a physical (PHY) layer and may be grouped or classified into several sub-layers, which are separated by reference points (e.g., $\alpha_1$ reference point, $\alpha_2$ reference point, and $\delta$ reference point). For example, the sub-layers may comprise a transport protocol specific-transmission convergence (TPS-TC) sub-layer, a physical media specific part of the physical medium (PMS-TC) sub-layer coupled to the TPS-TC sub-layer via an $\alpha_1$ reference point, and a physical media dependent (PMD) sub-layer coupled to the PMS-TC sub-layer via a $\delta$ reference point. One of ordinary skill in the art would understand terminology with respect to reference points and sub-layers as being described, for example, in International Telecommunication Union (ITU) Standard G.993.2, entitled "Very high speed digital subscriber line transceivers 2 (ADSL2)," dated December 2011, and ITU Standard G.998.4, entitled "Improved Impulse Noise Protection (INP) for DSL Transceivers," dated June 2010, which are incorporated herein by reference as if reproduced in their entirety.

In the DSL modem 200, the TPS-TC sub-layer may comprise a TPS-TC module 212. The TPS-TC module 212 may receive user data from a network source (e.g., the Internet) and process the user data using TPS-TC functions. Various types of TPS-TC functions may be used in the TPS-TC module 212, including, but not limited to, synchronous transfer mode (STM), asynchronous transfer mode (ATM), and packet transfer mode (PTM). After processing, the user data may be assembled or packed into one or more DTUs, which may then be forwarded to a DTU framer 232. Each DTU generated by the TPS-TC module 212 may comprise data bits and/or control bits. Each DTU may comprise a plurality of ATM cells, a plurality of PTM codewords, or a plurality of Reed Solomon (RS) codewords.

The PMS-TC sub-layer may comprise a DTU framer 232, a retransmission queue 238, and a retransmission multiplexer 236 configured as shown in FIG. 2. The DTU framer 232 may further process the DTU (e.g., providing additional data). For example, after the DTU framer 232, each DTU may further comprise additional octets carrying information such as sequencer identifier (SID), a time stamp (TS), overhead for a cyclic redundancy check (CRC), and padding bits.

DTUs processed by the DTU framer 232 may be fed into the retransmission multiplexer 236. In an embodiment, the retransmission multiplexer 236 may select either a DTU from the DTU framer 232 or a DTU from a retransmission queue 238 for transmission over the $\alpha_2$ reference point. The retransmission queue 238 is coupled to the retransmission multiplexer 236, for example, via a logical or physical switch. When a DTU from the DTU framer 232 is transmitted over the $\alpha_2$ reference point, the DTU may also be added to the retransmission queue 238. After a DTU is added into the retransmission queue 238, it may be kept in the queue for a period of time. The period of time duration may be pre-determined, for example, to be about 5 milliseconds (ms). The period of time should be sufficiently long to determine whether all the repeated transmissions of the DTU were corrupted when propagating in the subscriber line. If no user data is available in the TPS-TC module 212, one or more idle DTUs (IDTUs) each of which comprises entirely idle cells may be transmitted until new user data arrives at the TPS-TC module 212. Alternatively, the current DTU may be transmitted multiple times until new user data arrives.

If a corresponding apparatus, which is a recipient of the DTU, detects error or corruption in the DTU, it may send a negative acknowledgement (NACK) to the DSL modem 200. In an embodiment, since the DTU is transmitted to the recipient for a number of repeated DTU (NRD) times, the DSL modem 200 is configured to retransmit the DTU only if the DTU is corrupted in all the repeated transmissions. If retransmission is activated, the DTU may be located in the retransmission queue 238, for example, based on its SID, and then transmitted for an additional time. If an acknowledgement (ACK) is received (e.g., via a retransmission request channel) by the DSL modem 200 corresponding to the additional transmission of the DTU, the ACK indicates that the DTU was received by the CPE without error, in which case the DTU may be removed from the retransmission queue 238. Otherwise, the DTU may remain in the retransmission queue 238 until an ACK is received or until its storing period is reached. Furthermore, retransmission may be enabled in upstream and/or downstream directions.

During transmission of a DTU, the retransmission multiplexer 236 may feed the DTU into a scrambler module or unit 252. The DTU may then go through error correction in a forward error correction (FEC) unit 254, for example, which may use RS coding. Then the DTU may be processed by an interleaver 256. Afterwards, the DTU may then be fed into a latency path multiplexer 258, which combines data from multiple paths and/or channels. For example, the PMS-TC sub-layer may comprise two latency paths, denoted as $L_0$ and $L_1$ respectively, and a retransmission request channel (RRC). The latency path $L_0$ may contain only overhead data, while the latency path $L_1$ may contain DTUs (i.e., octets coming over the $\alpha_2$ reference point). In the latency path $L_0$, overhead information, including an embedded operations channel (eoc), an indicator bit (ib), and a network time reference (NTR), may be combined by an overhead multiplexer 260. Then, the overhead may be framed by a framer 262, which feeds into a scrambler unit 264. The scrambler unit 264 is coupled to a FEC unit 266, which is also coupled to an interleaver 268. Additionally, the RRC may carry an ACK or a NACK for received DTUs. For example, the RRC may be encoded in an FEC unit 270, for example, which may use an extended binary Golay code. The output from the two latency paths and the RRC are multiplexed by the latency path multiplexer 258 into a data structure that is transferred to the PMD module 292 over the δ reference point. After being processed by the PMD module 292, the DTU may be sent out of the DSL modem 200, for example, as digital multi-tone (DMT) symbols. The PMD sub-layer may comprise the elements shown between the $\alpha_2$ reference point and the δ reference point.

It should be noted that the modules illustrated with respect to FIG. 2 may only include a portion of all the necessary modules in a DSL modem. As such, other suitable modules or units, such as transmitter, receiver, analog front end, line drivers, etc., may be incorporated into the DSL modem 200 as would be appreciated by one of ordinary skill in the art upon viewing this disclosure.

Figure 3:
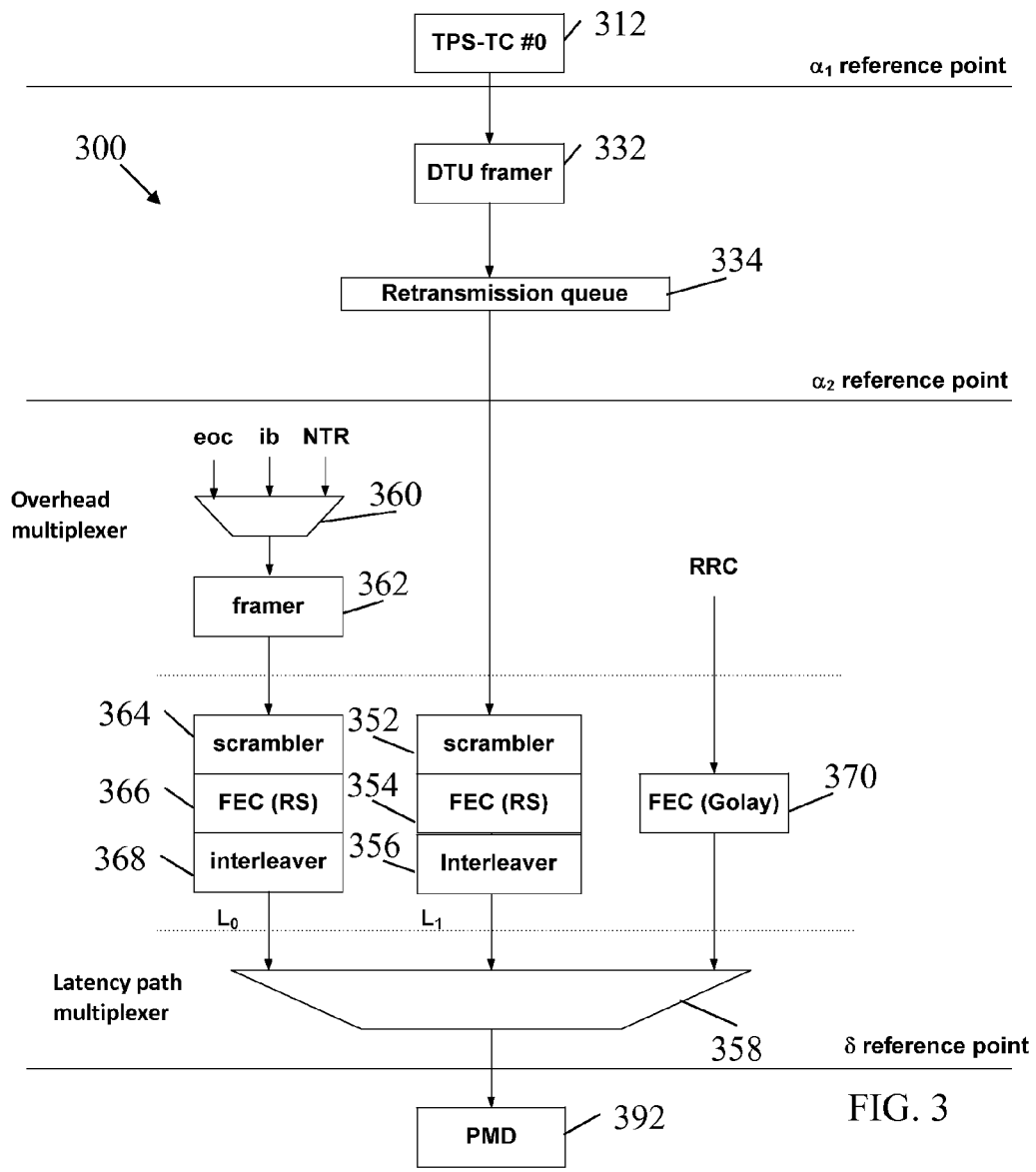
FIG. 3 is a logical view of an embodiment of a DSL modem.

FIG. 3 is a logical view of an embodiment of a DSL modem 300. The DSL modem 300 may be configured to implement discontinuous mode FDD, as employed in some VDSL2 systems, or TDD, as employed in G.fast. The DSL modem 300 may be employed in an access node, such as access node 102. The DSL modem 300 may comprise a TPS-TC sub-layer, a PMS-TC sub-layer coupled to the TPS-TC sub-layer via a $\alpha_1$ reference point, and a PMD sub-layer coupled to the PMS-TC sub-layer via a δ reference point.

In the DSL modem 300, the TPS-TC sub-layer may comprise a TPS-TC module 312. The TPS-TC module 312 may be configured similar to TPS-TC module 212, as previously disclosed, with respect to FIG. 2. The TPS-TC module 312 is in data communication with a DTU framer 332. For example, the TPS-TC module 312 may be configured to process user data, for example, to assemble one or more DTUs and to communicate (e.g., forward) the DTUs to the DTU framer 332.

The PMS-TC sub-layer may comprise the DTU framer 332 and retransmission queue 334 configured as shown in FIG. 3. That is, the DTU framer 332 may be directly connected to the retransmission queue 334. In such an embodiment, a retransmission multiplexer, such as, retransmission multiplexer 236 as shown in FIG. 2, is not employed between the TPS-TC module 312 and the retransmission queue 334. In an embodiment, the TPS-TC module 312 may inform the PMS-TC sub-layer (e.g., the DTU framer 332) when user data and/or control bits are available (e.g., a DTU worth of PTM codewords). The PMS-TC sub-layer (e.g., the DTU framer 332) may accept the data and/or control bits and may form one or more DTUs to be stored in the retransmission queue 334. In such an embodiment, a DTU may only be transferred to the PMS-TC sub-layer when user data is available, that is, a DTU may not be transferred from the TPS-TC module 312 to the retransmission queue 334 if there is no user data to transmit. Thus, idle DTUs may not be stored in the retransmission queue 334 (in other words, there may be no or very few idle DTUs stored in the retransmission queue 334). Optionally, the last DTU in a TDD-frame boundary may force the TPS-TC module 312 to transfer user data even if it is less than one DTU worth, for example, to avoid delaying user data. Additionally, the retransmission queue 334 may be configured to operate as a data frame buffer, for example, to store and/or organize incoming DTUs from the TPS-TC sub-layer.

During transmission of a DTU, the retransmission queue 334 may feed the DTU into a scrambler module or unit 352. The DTU may then go through error correction in a FEC unit 354, for example, which may use RS coding. Then the DTU may be processed by an interleaver 356. Afterwards, the DTU may then be fed into a latency path multiplexer 358, which combines data from multiple paths and/or channels. The PMS-TC sub-layer may comprise two latency paths, denoted as $L_0$ and $L_1$ respectively, and a RRC. The latency path $L_0$ may contain only overhead data, while the latency path $L_1$ may contain DTUs (i.e., octets coming over the $\alpha_2$ reference point). In the latency path $L_0$, overhead information, including an eoc, an ib, and a NTR, may be combined by an overhead multiplexer 360. Then, the overhead may be framed by a framer 362, which feeds into a scrambler unit 364. The scrambler unit 364 is coupled to a FEC unit 366, which is also coupled to an interleaver 368. Additionally, the RRC may carry an ACK or a NACK for received DTUs. For example, the RRC may be encoded in an FEC unit 370, for example, which may use an extended binary Golay code. The output from the two latency paths and the RRC are multiplexed by the latency path multiplexer 358 into a data structure that is transferred to the PMD module 392 over the δ reference point. After being processed by the PMD module 392, the DTU may be sent out of the DSL modem 300, for example, as DMT symbols. The PMD sub-layer may comprise the elements shown between the $\alpha_2$ reference point and the δ reference point.

It should be noted that the modules illustrated with respect to FIG. 3 may only include a portion of all the necessary modules in a DSL modem. As such, any other suitable modules or units, such as transmitter, receiver, analog front end, line drivers, etc., may be incorporated into the DSL modem 300 as would be appreciated by one of ordinary skill in the art upon viewing this disclosure.

Figure 4:
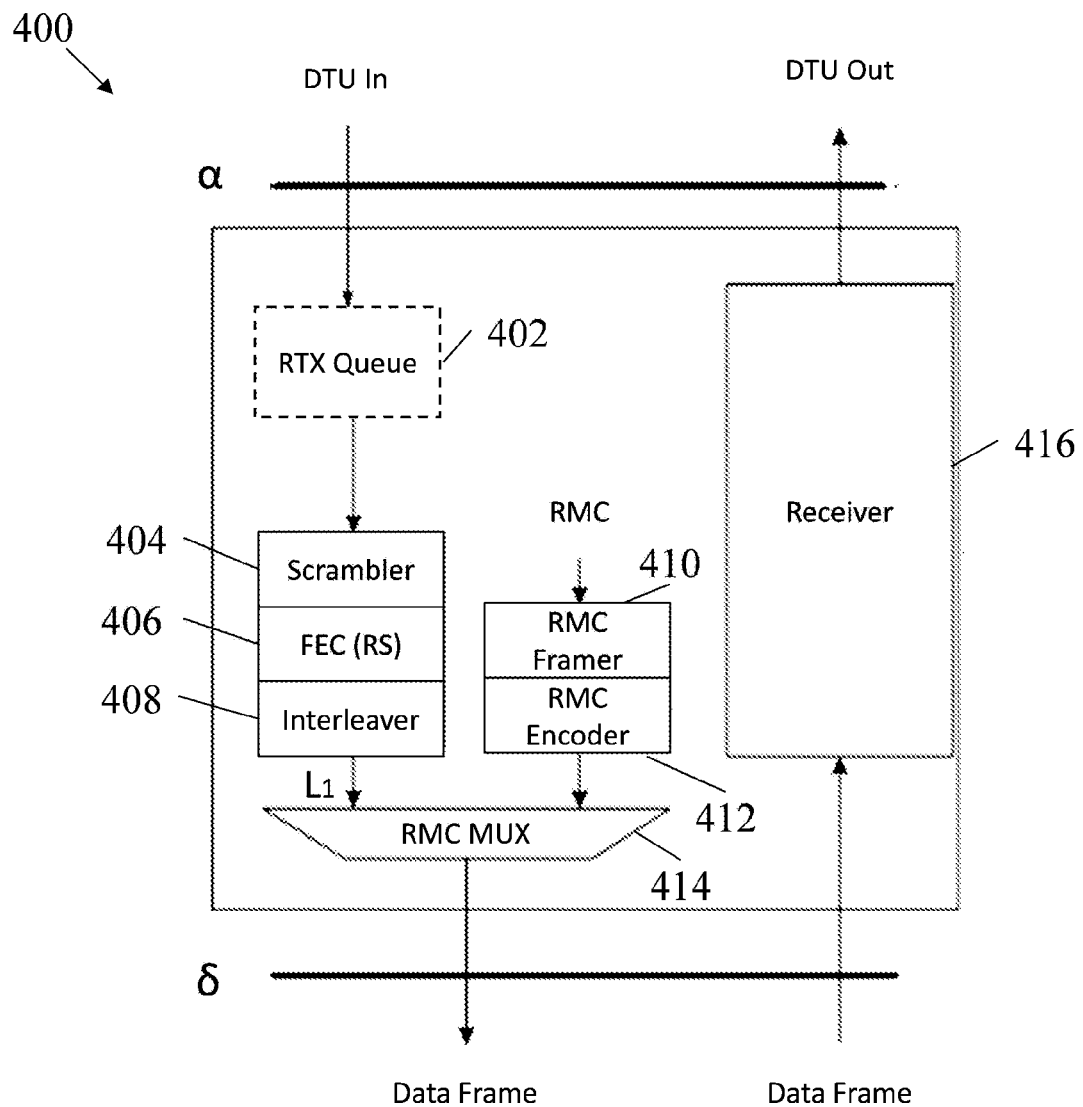
FIG. 4 is a logical view of an additional embodiment of a DSL modem.

FIG. 4 is a logical view of an additional embodiment of a DSL modem 400. The DSL modem 400 may be configured to implement TDD communication, e.g., as employed in G.fast. The DSL modem 400 may be employed in an access node, such as access node 102. The DSL modem 400 generally illustrates a PMS-TC sub-layer. The PMS-TC sub-layer may be coupled to a TPS-TC sub-layer via an α reference point and to a PMD sub-layer via a δ reference point. One of ordinary skill in the art would understand terminology with respect to reference points and sub-layers as being described, for example, in ITU Temporary Document 2012-11-4A-R20, entitled "Updated draft text for G.fast—version 3.0, " dated November 2012, which is incorporated herein by reference as if reproduced in its entirety.

In an embodiment, the DSL modem 400 may be configured to receive a DTU from a DTU framer (not shown) in the TPS-TC sub-layer via a retransmission queue 402. The retransmission queue 402 may be configured to operate as a data frame buffer, for example, to store and/or organize incoming DTUs from the TPS-TC sub-layer. The retransmission queue 402 is in-line with (i.e., directly connected to) a scrambler module or unit 404 and may feed DTUs into the scrambler module or unit 404. Similar to FIG. 3, a retransmission multiplexer is not employed between a TPS-TC module and the retransmission queue 402. A DTU may only be transferred to the PMS-TC sub-layer when user data is available, that is, a DTU may not be transferred from the TPS-TC sub-layer to the retransmission queue 402 if there is no user data to transmit. Thus, idle DTUs may not be stored in the retransmission queue 402 (in other words, there may be no or very few idle DTUs stored in the retransmission queue 402).

The DTU may then go through error correction in a FEC unit 406, for example, which may use RS coding. Then the DTU may be processed by an interleaver 408. The PMS-TC sub-layer may comprise a latency path (e.g., latency path $L_1$) and a robust management channel (RMC) path. The latency path may contain DTUs (i.e., octets coming over the α reference point). The RMC path may carry an ACK or a NACK for received DTUs. For example, RMC primitives (e.g., ACKs and NACKs) may be fed into a RMC framer 410 to be organized and/or stored. Additionally, the RMC framer 410 may feed the RMC primitives to a RMC encoder 412 to be encoded, for example, using an extended binary Golay code. The output of the latency path and the RMC path are multiplexed by a RMC multiplexer 414 into a data structure that is transferred over the δ reference point (e.g., to a PMD module) and may be sent out of the DSL modem 400, for example, as DMT symbols.

Additionally, the PMS-TC sub-layer may comprise a receiver 416. In such an embodiment, the receiver 416 is configured to receive a data frame over the δ reference point (e.g., from the PMD) and to communicate one or more DTUs over the α reference point (e.g., to the TPS-TC). The receiver 416 may be configured to perform one or more processes on the data frame and/or DTUs prior to communicating the DTU over the α reference point. For example, the receiver 416 may be configured to perform forwarding, encryption, decryption, encapsulation, decapsulation, transcoding, any other suitable operation as would be appreciated by one of ordinary skill in the art upon viewing this disclosure, or combination thereof.

Figure 5:
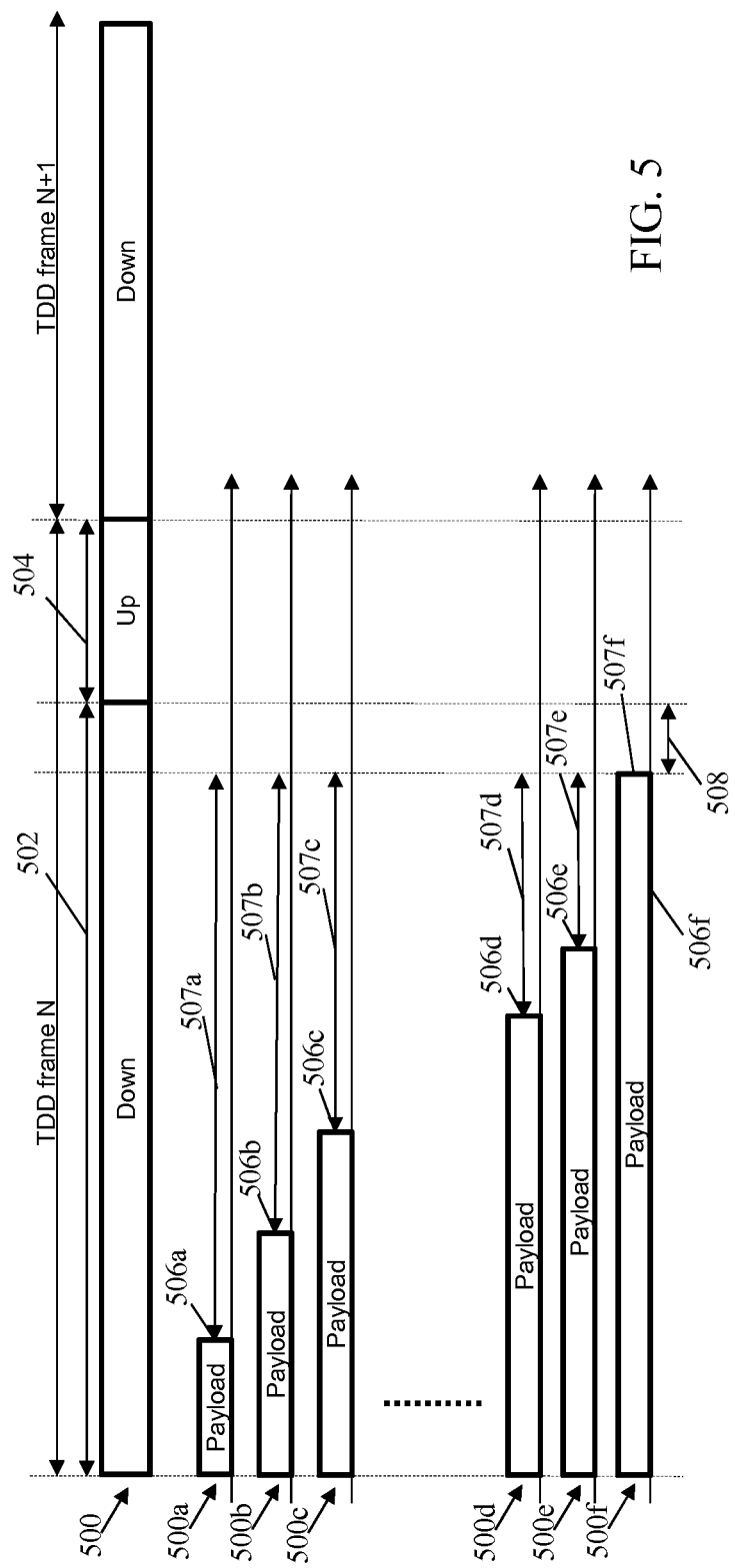
FIG. 5 is a timing diagram of embodiments of a data frame.

FIG. 5 is a timing diagram of embodiments of a data frame 500 (e.g., a TDD data frame) for a DSL modem, for example, DSL modems 300 and 400. In general, the data frame 500 (e.g., data frames 500a-500f) may comprise a downstream period 502 and an upstream period 504. The downstream period 502 may be utilized to transmit a pay load 506 (e.g., payloads 506a-506f). The pay load 506 may comprise overhead data, DTUs, ACKs/NACKs, the number of symbols or DTUs expected to be transmitted, any other suitable data as would be appreciated by one of ordinary skill in the art upon viewing this disclosure, or combinations thereof. The payload data may be organized in any suitable order. For example, the payload 506 may be arranged such that the number of symbols or DTUs (e.g., retransmission DTUs and/or new DTUs) expected to be transmitted is transmitted at the beginning of the data frame 500. The pay load 506 size may vary, for example, as illustrated by payloads 506a-506f. For example, the pay load may utilize an entire downstream portion of a data frame and may be referred to as a full pay load. Alternatively, the pay load may not utilize an entire downstream portion of a data frame and may be referred to as a partial pay load. Additionally, the data frame 500 may comprise a dead time period 508 (e.g., a period where no data is transmitted) before the upstream period 504. An interim period 507 (e.g., interim periods 507a-507f) may be generally defined as the period between the payload 506 and the dead time period 508. The interim period 507 may be utilized to implement dynamic power saving techniques, as will be disclosed herein.

For example, during the interim period 507 a DSL modem may employ power saving techniques, such as, traffic-adaptive repeated transmission (TARTX), power saving idle DTU (PSIDTU), or traffic-adaptive discontinuous mode power saving (DMPS). Additional details for TARTX techniques may be as described in U.S. patent application Ser. No. 13/682,842 entitled "Traffic-Adaptive Repeated Transmission," by Ruxiang Wang, et al. and filed on Nov. 21, 2012, which is hereby incorporated by reference in its entirety. Additional details for PSIDTU techniques may be as described in U.S. patent application Ser. No. 14/018,907 entitled "Power Saving Idle Data Transmission Units," by Ruxiang Wang, et al. and filed on Sep. 5, 2013, which is hereby incorporated by reference in its entirety. Alternatively, any other suitable power saving techniques (e.g., dynamic or discontinuous power saving techniques) may be employed as would be appreciated by one of ordinary skill in the art upon viewing this disclosure.

The upstream period 504 may be utilized by a DSL modem to receive a data frame, such as a data frame comprising ACKs/NACKs in regards to a symbol or DTU transmission. The ACKs/NACKs received may be in regards to the DTUs transmitted in the current data frame or may be in regards to the DTUs transmitted in a previous data frame.

Figure 6:
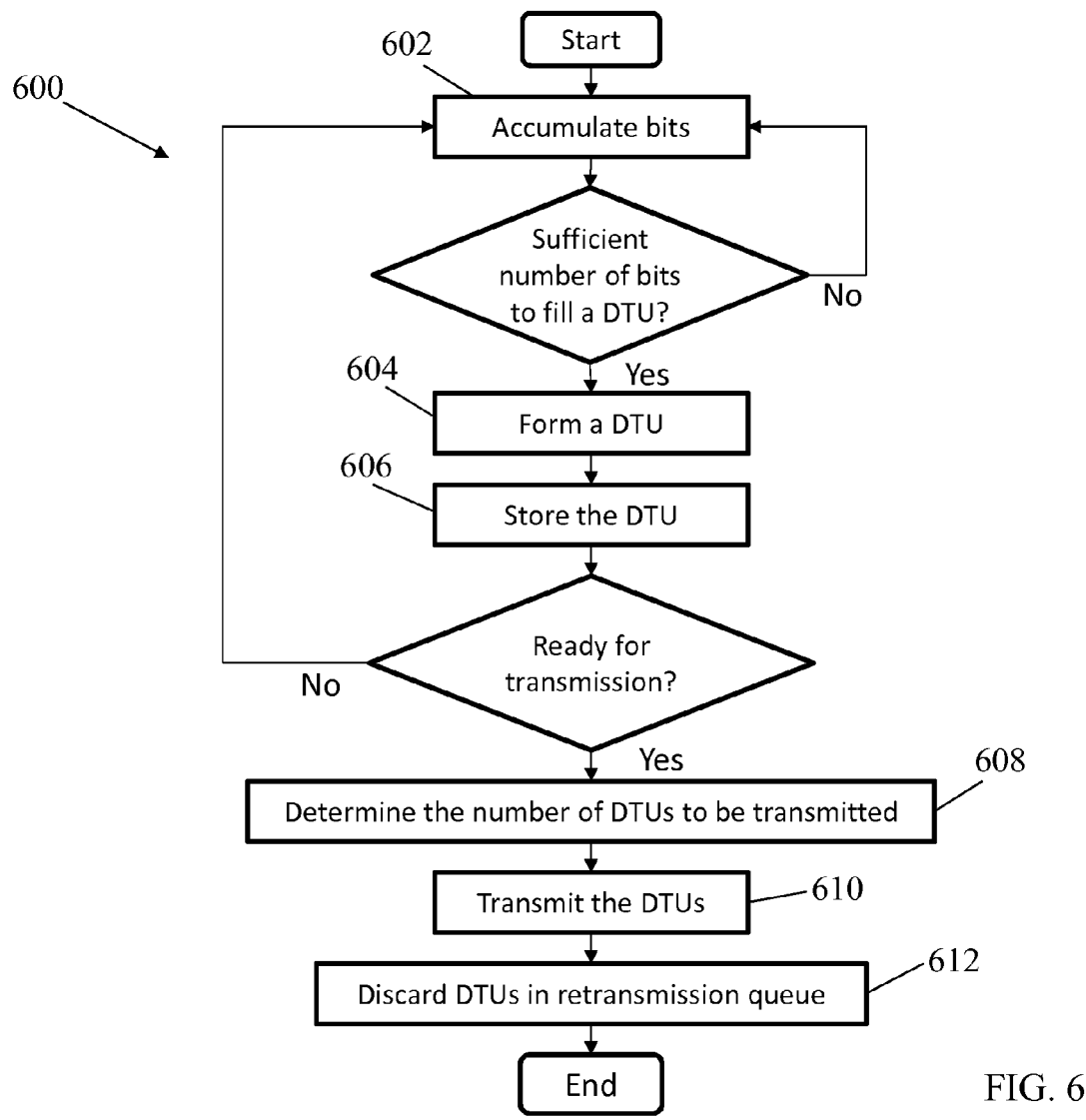
FIG. 6 is a flowchart of an embodiment of a data transmission method.

FIG. 6 is a flowchart of an embodiment of a data transmission method 600 for a DSL modem, such as DSL modem 300 and/or 400. In block 602, when user data becomes available, the TPS-TC may accumulate the user data to be transmitted. For example, the TPS-TC sub-layer may accumulate user data until a sufficient number of bits or octets are available to form a DTU. In an embodiment, the TPS-TC sub-layer may inform the PMS-TC sub-layer when a DTU worth of user data is available. In block 604, the user data may be transferred from the TPS-TC sub-layer and may be formed into a DTU. For example, the user data may be fed to a DTU framer (e.g., DTU framer 332 shown in FIG. 3) to generate a DTU. In block 606, the DTU may be stored to be transmitted. For example, the DTU may be fed to a retransmission queue (e.g., retransmission queue 334 shown in FIG. 3) to be stored (i.e., the retransmission queue may operate as a DTU buffer). Additionally, no IDTUs may be passed to the retransmission queue. In an embodiment, the retransmission queue may store a sufficient quantity of DTUs for multiple data frame transmissions (e.g., two data frames). In block 608, when data is ready to be transmitted (i.e., during a transmission opportunity), the DSL modem may determine the number of DTUs (e.g., retransmission DTUs and/or new DTUs) to be transmitted over the next transmission time opportunity. The number of DTUs to be transmitted may be all of the DTUs stored in the retransmission queue. Alternatively, the number of DTUs to be transmitted may be a portion or subset of the DTUs stored in the retransmission queue. This information may be communicated to the receiver and/or used to prepare for turning off symbols. Alternatively, dynamic and/or discontinuous power saving techniques, such as, TARTX, PSIDTU, and/or any other suitable techniques may be employed. In block 610, the predetermined number of DTUs may be transmitted. For example, the DTUs may be fed from the retransmission queue to be processed and transferred to a PMD module (e.g., PMD module 392 shown in FIG. 3). In block 612, upon successfully transmitting a DTU (e.g., as indicated by a corresponding ACK), the DTU may be discarded from the retransmission queue. In the event the DTU transmission fails (e.g., as indicated by a NACK), a failed DTU may not be discarded from the retransmission queue and may be retransmitted during the next transmission time opportunity.

Figure 7:
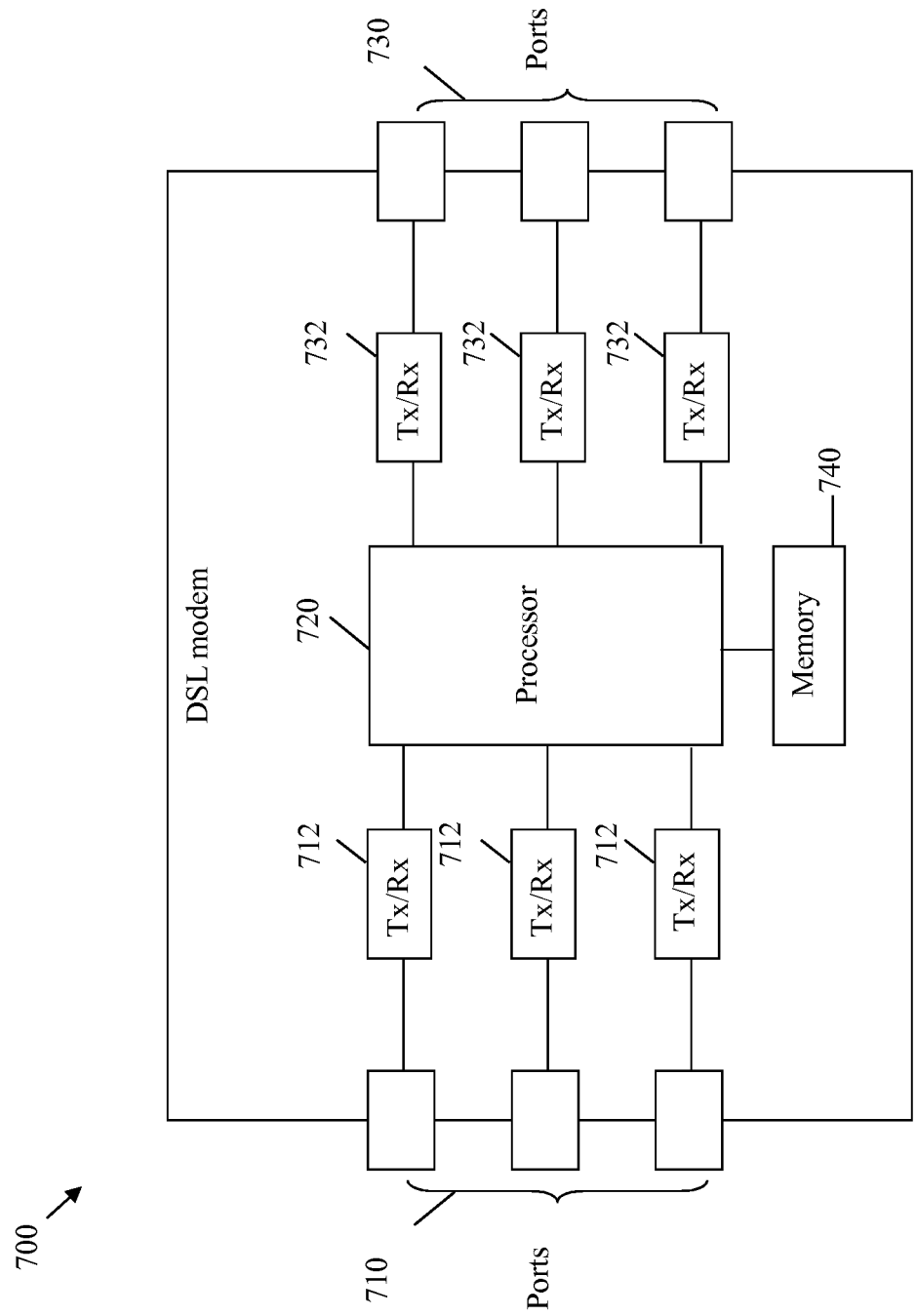
FIG. 7 is a schematic diagram of an embodiment of a DSL modem.

FIG. 7 is a schematic view of an embodiment of a DSL modem 700. At least some of the modems and/or methods, such as the DSL modems 300 and 400 and data transmission method 600, described in the disclosure may be implemented on a DSL modem 700. The DSL modem 700 may be located on an operator side (e.g., in a distribution point or DSLAM) in which case each of a first plurality of ports 710 may be connected or coupled to a subscriber line. Alternatively, the DSL modem 700 may be located at a user's end, such as in a CPE, in which case there may be only one port 710 coupled to one subscriber line. A transmitter (Tx)/receiver (Rx) unit 712 may be coupled to each port 710 and configured to transmit data to or receive data from other DSL modems or network units. A logic unit or processor 720 coupled to the plurality of Tx/Rx units 712 may be configured to process data and determine which DSL modem or network unit to send the data to. The processor 720 may be implemented as one or more central processing unit (CPU) chips, cores (e.g., a multi-core processor), field-programmable gate arrays (FPGAs), application specific integrated circuits (ASICs), and/or digital signal processors (DSPs).

A memory 740 may be coupled to the processor 720 and configured to store various types of data. The memory 740 may comprise a secondary storage, read only memory (ROM), random access memory (RAM), any other suitable data storage device as would be appreciated by one of ordinary skill in the art upon viewing this disclosure, or combination thereof. In an embodiment, a secondary storage may comprise of one or more disk drives, solid state drives, or tape drives and is used for non-volatile storage of data and as an over-flow data storage device if a RAM is not large enough to hold all working data. The secondary storage may be used to store programs that are loaded into a RAM when such programs are selected for execution. A ROM may be used to store instructions and perhaps data that are read during program execution. The ROM may be a non-volatile memory device that typically has a small memory capacity relative to the larger memory capacity of a secondary storage. The RAM may be used to store volatile data and perhaps to store instructions. Access to both the ROM and the RAM is typically faster than to the secondary storage. In an embodiment, instructions to be executed by the processor 720 may be stored in the memory 740. Since the DSL modem 700 may be an intermediary between two network units or sources, it may process and forward data from one source to another. Thus, the DSL modem 700 may further comprise a second plurality of ports 730 coupled to a second plurality of Tx/Rx units 732 for transmitting data to or receiving data from other network units. The processor 720 may be configured to implement any of the schemes/methods as will be described herein.

It is understood that by programming and/or loading executable instructions onto the DSL modem 700, at least one of the processor 720, the memory 740, or the Tx/Rx unit 712, 732 are changed, transforming the DSL modem 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an embodiment, a retransmission queue (e.g., retransmission queue 334 or retransmission queue 402), a system comprising such a retransmission queue, and/or a data transmission method employing such a retransmission queue, as disclosed herein or in some portion thereof, may be advantageously employed to provide power savings and/or to reduce the average traffic between the TPS-TC sub-layer and the PMS-TC sub-layer. In a conventional data transmission method a DTU is stored in a retransmission queue only when it is transmitted. In a data transmission method, such as, data transmission method 600 a DTU is stored in a retransmission queue before they are transmitted. The DTUs may be buffered and/or temporarily stored in the retransmission queue and, thereby allow for per-TDD-frame dynamic power savings. For example, this may reduce the peak bandwidth requirement of a data transfer channel by accommodating uniform traffic over an entire TDD frame. Additionally, this may reduce the peak bandwidth requirement of the TPS-TC by allowing DTU framers to work in an unsynchronized mode over the entire TDD frame. In a conventional data transmission method a new DTU is requested by the PMS-TC sub-layer. In a data transmission method, such as data transmission method 600, the TPS-TC initiates the data transfer which allows DTUs to be formed from available user data with minimal or no idle cells inserted. This may reduce the average traffic between the TPS-TC sub-layer and the PMS-TC sub-layer, and may also reduce a peak bandwidth requirement of the TPS-TC/Network Interface (NIF) data transfer channel because a buffer accommodates uniform traffic at the TPS/NIF interface over an entire TDD frame.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of discontinuous transmission data communication in a digital subscriber line (DSL) transceiver unit, the method comprising:
   determining that a number of a plurality of bits available to transmit is enough to fill a data transfer unit (DTU);
   forming the DTU, by a DTU framer, comprising the plurality of bits;
   transferring the DTU to a retransmission queue, wherein the retransmission queue is directly connected to the DTU framer; and
   determining DTUs from the retransmission queue to be transmitted over a next time period used for transmitting over a DSL by the DSL transceiver unit.

2. The method of claim 1, wherein determining that the number of the plurality of bits available to transmit is enough to fill the DTU is performed by a transport protocol specific-transmission convergence (TPS-TC) sub-layer.

3. The method of claim 2, wherein a physical media specific-transmission convergence (PMS-TC) sub-layer comprises the DTU framer and the retransmission queue.

4. The method of claim 2, wherein the TPS-TC sub-layer comprises the DTU framer, wherein a physical media specific-transmission convergence (PMS-TC) sub-layer comprises the retransmission queue, and wherein the DTU framer is directly connected to the retransmission queue.

5. The method of claim 1, wherein no idle DTUs are stored in the retransmission queue.

6. A discontinuous transmission data communication digital subscriber line (DSL) transceiver unit comprising:
   a retransmission queue;
   at least one processor configured to determine that a number of a plurality of bits available to transmit is enough to fill a data transfer unit (DTU);
   a DTU framer coupled to the at least one processor and directly connected to the retransmission queue, wherein the DTU framer is configured to:
   form the DTU comprising the plurality of bits; and
   transfer the DTU to the retransmission queue,
   wherein the at least one processor is further configured to determine DTUs from the retransmission queue to be transmitted over a next time period used for transmitting over a DSL by the DSL transceiver unit.

7. The transceiver unit of claim 6, wherein the retransmission queue is configured to store a plurality of DTUs until a next time period used for transmitting over the DSL by the DSL transceiver unit.

8. The transceiver unit of claim 6, wherein no idle DTUs are stored in the retransmission queue.

9. The transceiver unit of claim 6, wherein the retransmission queue does not request DTUs.

10. The transceiver unit of claim 6, wherein the DTU framer and the retransmission queue are within a physical media specific-transmission convergence (PMS-TC) sub-layer.

11. The transceiver unit of claim 6, wherein determining the DTUs from the retransmission queue to be transmitted over the next time period comprises:
    receiving a negative acknowledgement (NACK) corresponding to a failed DTU in response to a failed DTU transmission; and
    retransmitting the failed DTU.

12. The transceiver unit of claim 6, wherein determining the DTUs from the retransmission queue to be transmitted over a next time period comprises:
    receiving acknowledgements (ACKs) or negative acknowledgements (NACKs) in response to transmitting the DTUs; and
    selecting the DTUs to be transmitted in response to the ACKs or NACKs.

13. A method of discontinuous transmission data communication in a digital subscriber line (DSL) transceiver unit, the method comprising:
    accumulating bits until there are a plurality of bits sufficient to fill a data transfer unit (DTU);

forming, by a DTU framer, the DTU comprising the plurality of bits;

storing the DTU in a retransmission queue, wherein the retransmission queue is directly connected to the DTU framer;

repeating the accumulating, the forming, and the storing steps while there is sufficient space in the retransmission queue;

determining a number of DTUs to be transmitted from the retransmission queue over a next transmission time opportunity;

transmitting the DTUs; and discarding the DTUs in the retransmission queue that are acknowledged by a receiver or overstayed in the retransmission queue over a time limit.

14. The method of claim 13, wherein the accumulating bits is performed by a transport protocol specific-transmission convergence (TPS-TC) sub-layer.

15. The method of claim 14, wherein a physical media specific-transmission convergence (PMS-TC) sub-layer comprises the DTU framer and the retransmission queue, and wherein the DTU framer is directly connected to the retransmission queue.

16. The method of claim 14, wherein the TPS-TC sub-layer comprises the DTU framer, wherein a physical media specific-transmission convergence (PMS-TC) sub-layer comprises the retransmission queue, and wherein the DTU framer is directly connected to the retransmission queue.

17. The method of claim 13, wherein no idle DTUs are stored in the retransmission queue.

18. The method of claim 13, further comprising:

receiving a negative acknowledgement (NACK) corresponding to a failed DTU in response to a failed DTU transmission; and retransmitting the failed DTU.

19. The method of claim 13, further comprising:

receiving acknowledgements (ACKs) or negative acknowledgements (NACKs) in response to transmitting the DTUs; and determining the DTUs from the retransmission queue to be transmitted over a next time period in response to the ACKs or NACKs.

20. The method of claim 14, wherein the DSL transceiver unit is a time-division-duplex G.fast transceiver unit, or a frequency-division-duplex very high speed digital subscriber line 2 (VSDL2) transceiver unit in a discontinuous mode.

* * * * *